(12) United States Patent
Abe

(10) Patent No.: US 7,557,850 B2
(45) Date of Patent: Jul. 7, 2009

(54) DIGITAL CAMERA WITH A PLURALITY OF DISPLAY SCREENS

(75) Inventor: Tatsuro Abe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 836 days.

(21) Appl. No.: 10/843,429

(22) Filed: May 12, 2004

(65) Prior Publication Data
US 2004/0263659 A1    Dec. 30, 2004

(30) Foreign Application Priority Data
Jun. 30, 2003    (JP)    ............................. 2003-188707

(51) Int. Cl.
*H04N 5/222*    (2006.01)
(52) U.S. Cl. ............................................. 348/333.01
(58) Field of Classification Search ...............................
348/333.01–333.13
See application file for complete search history.

(56) References Cited

U.S. PATENT DOCUMENTS 6,441,854 B2 *  8/2002  Fellegara et al. ....... 348/333.13
6,812,967 B1 *  11/2004  Niikawa et al. ........ 348/333.05
6,844,899 B2 *  1/2005  Oeda et al. ............. 348/333.13
2002/0171747 A1 *  11/2002  Niikawa et al. ........ 348/333.01

FOREIGN PATENT DOCUMENTS

JP    2001-169150    6/2001

* cited by examiner

*Primary Examiner*—John M Villecco
*Assistant Examiner*—Tuan H Le
(74) *Attorney, Agent, or Firm*—Finnegan, Henderson, Farabow, Garrett & Dunner, L.L.P.

(57) ABSTRACT

The present invention provides a digital camera that has an EVF, an LCD screen, a switching unit, and display-state restoring unit. The switching unit switches display to the EVF or the LCD screen in accordance with an input signal. The display-state restoring unit automatically restores the EVF and the LCD screen to states that they assume before the switching unit switches the display, when a process initiated by the input signal is completed.

6 Claims, 3 Drawing Sheets

DIGITAL CAMERA WITH A PLURALITY OF DISPLAY SCREENS

CROSS-REFERENCE TO RELATED APPLICATIONS

This application is based upon and claims the benefit of priority from prior Japanese Patent Application No. 2003-188707, filed Jun. 30, 2003, the entire contents of which are incorporated herein by reference.

BACKGROUND OF THE INVENTION

1. Field of the Invention

The present invention relates to a digital camera which has a plurality of display screens and which is user-friendly.

2. Description of the Related Art

Digital cameras have been developed. They can acquire an optical image of an object, generate an electric video signal representing the optical image acquired, convert the video signal to digital data, and store the digital data in a digital recording medium. Some of the digital cameras have a display screen (liquid crystal panel, hereinafter called "LCD screen"), in addition to the electronic viewfinder (hereinafter referred to as "EVF"). The LCD screen is relatively large. It enables the user to confirm any image just photographed and any image reproduced from digital data stored in the recording medium.

The user may look at the EVF to adjust the zooming in accordance with what he or she sees in the EVF. The LCD screen is another useful display screen. It can display the images reproduced from the digital data stored in the recording medium, enabling the user to confirm the images he or she has photographed.

Specific uses of such two display screens are disclosed in, for example, Jap. Pat. Appln. KOKAI Publication 2001-169150. More specifically, the user uses the EVF (i.e., looking-into type display) displays the image being photographed, whereas the LCD screen displays information other than images (e.g., the operating conditions of the camera, the operation menu, and the like). Since the two display screens display different information items, the camera is more user-friendly than otherwise.

It has not been profoundly studied how to use the EVF and LCD screen on any digital camera hereto developed display. Hitherto, the two display screens display either the same information or different items of information, in accordance with the user's instructions.

BRIEF SUMMARY OF THE INVENTION

Accordingly, an object of the present invention is to provide a digital camera with a plurality of display screens, in which two display units can be automatically switched when the user changes the operating mode of the camera, to display the most desirable information items, and which is therefore convenient to the user.

According to an aspect of the invention, there is provided a digital camera having a camera body, first display means with a display area, second display means with a display area larger than the display area of the first display means, and a display-state switching means for switching from the first display means to the second switching means, or vice versa, so that one display means is on and the other display means is off. The digital camera comprises: switching means for forcibly switching display to the first display means or the second display means in accordance with an input signal; and display-state restoring means for automatically restoring the first display means and the second to states that the first display means and the second assume before the switching means switches the display, when a process initiated by the input signal is completed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the invention will be described below, with reference to the accompanying drawings.

Figure 1A:
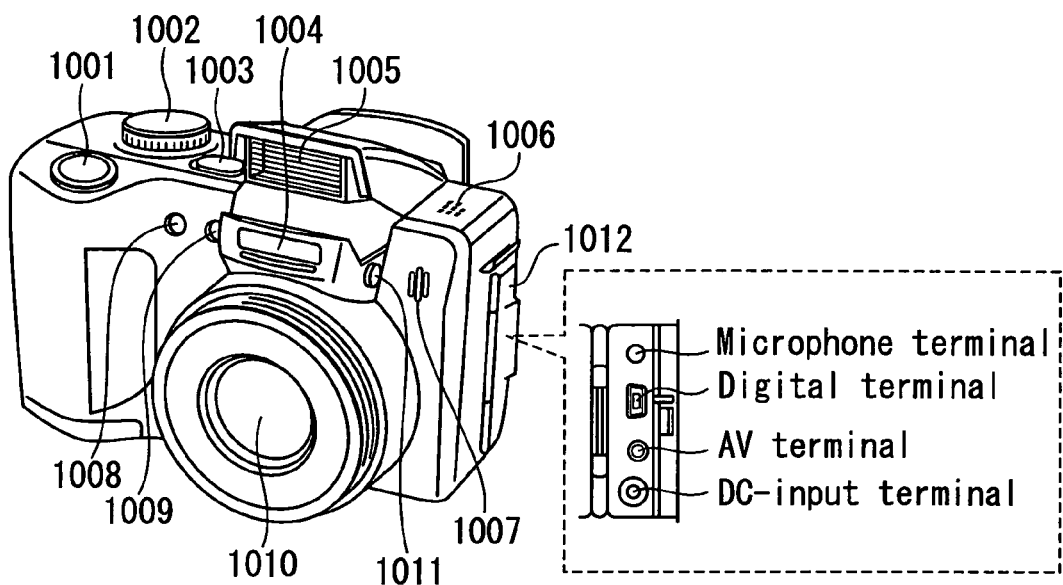
FIG. 1A is a perspective view of a digital camera seen from the front.
Figure 2:
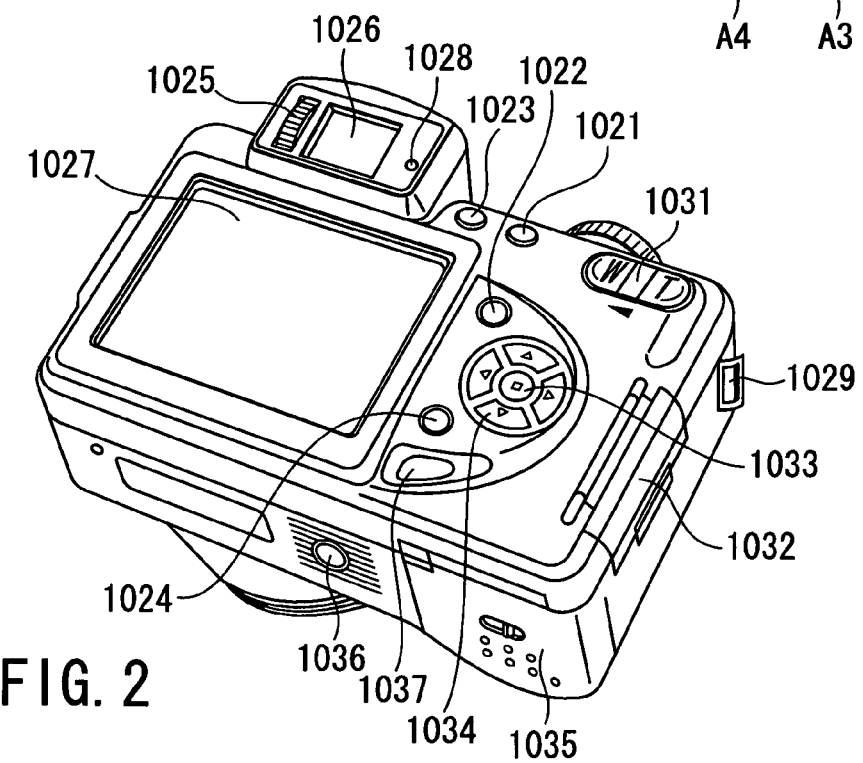
FIG. 2 is another plan view of the digital camera seen from the back and somewhat below.

FIG. 1A is a perspective view of a digital camera according to the invention, as seen from the front. FIG. 2 is another plan view of the digital camera seen from the back and somewhat below.

As FIG. 1A shows, the digital camera has a shutter button 1001, a mode dial 1002, and a power switch 1003. The camera also has a display unit 1004 called "front LED." The display unit 1004 characterizes the digital camera.

The digital camera further has a flash lamp 1005, a speaker 1006, a microphone 1007, a remote-control light-receiving 1008, a flash-light adjusting sensor 1009, and a lens 1010.

The digital camera has a terminal cover 1012. The cover 1012 may be opened to expose an external-microphone terminal, a digital-data output terminal, an AV terminal and a DC-input terminal.

Figure 1B:
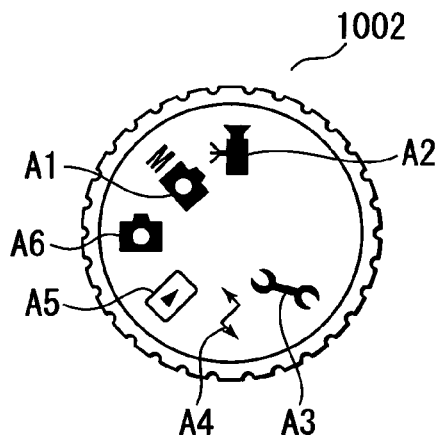
FIG. 1B is a plan view of the mode dial provided on the digital camera shown in FIG. 1A.

FIG. 1B illustrates the mode dial 1002. The mode dial 1002 has icons printed on it. The icons represent various modes in which the camera can operate. Icon A1 represents the manual-photographing mode (in which the white balance, exposure time, diaphragm opening, shutter speed, and the like can be manually controlled). Icon A2 represents the moving-picture mode (in which a moving picture can be photographed). Icon A3 represents the setup mode (in which the basic setups of the camera, e.g., sound, automatic power-off, customizing, language, video-data output, date and system mode). Icon A4 represents the PC mode (in which video data is input to personal computers). Icon A5 represents the reproduction mode, and icon A6 represents the automatic photographing mode. The user may turn the mode dial 1002 to bring one of icons A1 to A6 to a specified position, thereby to select the operating mode that the icon represents.

As FIG. 2 shows, a flash button 1021, a menu button 1022, a self-timer & remote-control button 1023, an erase button 1024, and a visibility-adjusting dial 1025 are arranged on the back of the camera. An EVF 1026 and a liquid display unit 1027 are provided on the back of the camera, too. The liquid display unit 1027 has a screen larger than that of the EVF 1026, which is a liquid crystal display, too. The unit 1027 will be called "LCD screen" so that it may be distinguished from the EVF 1026. A finder LED 1028 is arranged besides the EVF 1026; it may emit light to show that the EVF 1026 is on. A shoulder-strap holder 1029 is secured to one side of the camera.

Moreover, a Tele/Wide button 1031, an OK button 1033 and selection buttons 1034 are provided on the back of the camera. When operated, the Tele/Wide button 1031 set a degree of zooming. When pushed, each selection button 1034 selects a menu items or an image. A guard cover 1032 is laid on the corner defined by the back and one side of the camera. A battery cover 1035 is provided on the bottom of the camera. A screw hole 1036 is cut in the bottom of the camera, to hold the top of a tripod.

A display button 1037 is arranged on the back of the camera. When depressed, the display button 1037 switches the display mode of the EVF 1026 and LCD screen 1027. If pushed rather long, the display button 1037 sets the EVF 1026 and the LCD screen 1027 in sleep mode to save the battery power. The LCD screen 1027 has a size ranging from 1.5 to 2.5 inches, as most display units of this type. By contrast, the EVF 1026 is a small peeping window.

Figure 3:
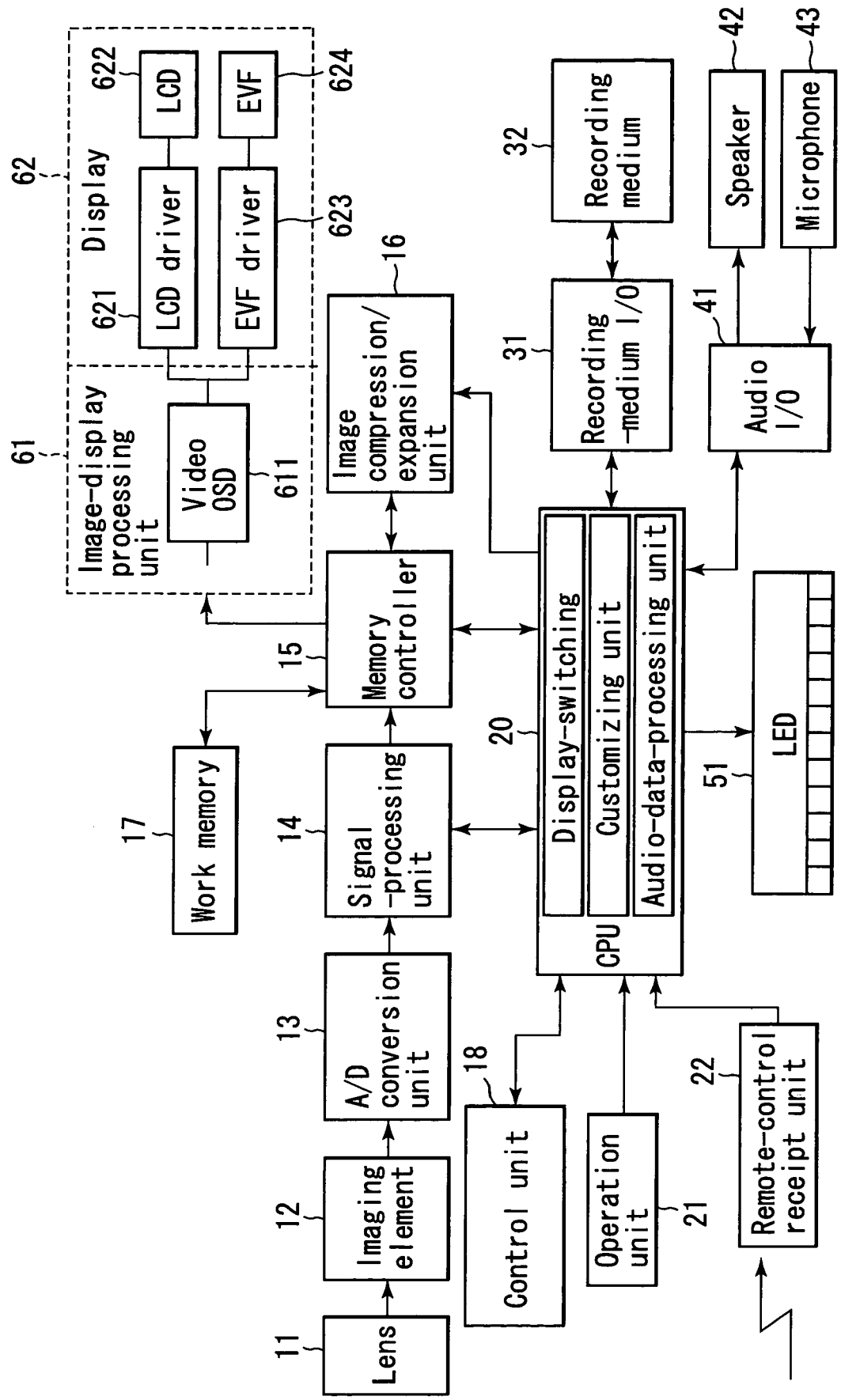
FIG. 3 is a block diagram illustrating the optical section and electric section of the digital camera.

FIG. 3 is a block diagram that illustrates the optical section and electric section of the digital camera. As may be understood from FIG. 3, the light from the object passes through a lens 11 and reaches the image-forming surface of an imaging element 12 (e.g., a CCD element), thus forming an image of the object. The imaging element 12 converts the image into an electric signal. The electric signal is supplied to an analog-to-digital (A/D) conversion unit 13. The unit 13 converts the signal to a digital signal, which is input to a signal-processing unit 14. The signal-processing unit 14 performs gamma correction, color-signal separation, white-balance control, and the like.

Unless the shutter is operated in normal photographing conditions, the signal-processing unit 14 outputs video data via a memory controller 15 to an image-display processing unit 61. The processing unit 61 converts the video data to data that the EVF 624 or LCD screen 622 can display and combines menu items or the like data items, thus generating new video data. This video data is supplied from the image-display processing unit 61 to the LCD driver 621 and/or the EVF driver 623, both incorporated in a display 62. Thus, the EVF 624 and/or the LCD screen 622 displays the image being photographed.

When the shutter is operated, an image compression/expansion unit 16 compresses the video data (in JPEG mode, for example). The video data thus compressed is stored via a recording-medium interface 31 into a recording medium 32 under the control of a CPU (Central Processing Unit) 20. The recording medium 32 may be one selected from various media. It may be, for example, a semiconductor memory, an optical disk or a magnetic disk.

The video data may be read from the recording medium 32. In this case, the image compression/expansion unit 16 expands the video data under the control of the CPU 20. The video data thus expanded is input to the image-display processing unit 61 via the memory controller 15. Thus, the EVF 624 or the LCD screen 622 displays the image represented by the video data.

A work memory 17 is used in the process of editing the video data, forming a thumbnail image or changing the order of images. The work memory 17 can store one frame of video data or frames of video data. The video data stored in the work memory 17 is input, whenever necessary, to the image-display processing unit 61 via the memory controller 15. Thus, the user can know how the video data is being edited, looking at the image displayed on either the EVF 624 or the LCD screen 622.

While the video data is being generated or edited, audio data can be acquired from a microphone 43 via an audio interface 41 under the control of the CPU 20. The audio data is stored, along with the video data, in the recording medium 32. The audio data is read from the recording medium 32, together with the video data. It is then supplied via the audio interface 41 to a speaker 42. The speaker 42 generates sound from the audio data. According to this invention, the speaker 42 may not generate sound when the user wants to confirm the image only. This is a characterizing feature of the camera according to this invention.

In preparation for a photographing operation, the CPU 20 makes a control unit 18 perform zooming, automatic iris-adjustment (AE), automatic focusing (AF), flash control and the like in accordance with control signals. The CPU 20 receives operation signals from external devices through an operation unit 21 and a remote-control receipt unit 22. The CPU 20 is connected to an external connection interface (not shown). Hence, the camera can be connected to external displays such as TVs.

The CPU 20 can control an operating-mode display called "front LED 51." The front LED 51 can emit light in different colors and in various modes to inform the user of the current operating mode of the camera. More precisely, the front LED 51 can emit light in, for example, six colors. It can emit light in each color in, for example, four modes, i.e., slow blinking, rapid blinking, continuous light-emission and intermittent light-emission.

The user can combine each light-emitting mode with the colors in which the front LED 51 can emit. In other words, the user can customize various mode-color combinations that indicate various modes in which the camera may operate. This customization is another characterizing feature of the camera according to this invention.

The camera of this invention is particularly characterized in that the first display unit (EVF) and the second display unit (LCD screen) larger than the first display unit are automatically switched, in accordance with the data input to the camera and the current operating mode of the camera. Thus, the two display units can display two information items that are desirable in view of the mode in which the camera is operating.

The CPU 20 has a customizing unit, an audio-data-processing unit, and a display-switching unit. The customizing unit customizes various mode-color combinations. The audio-data-processing unit processes audio data. The display-switching unit switches the two display units. The CPU further has a means for switching the operating mode of each display unit, and for recovering the state of each display unit to the previous operating mode. The previous operating mode is, for example, the status that is set when the power switch was turned off.

Figure 4:
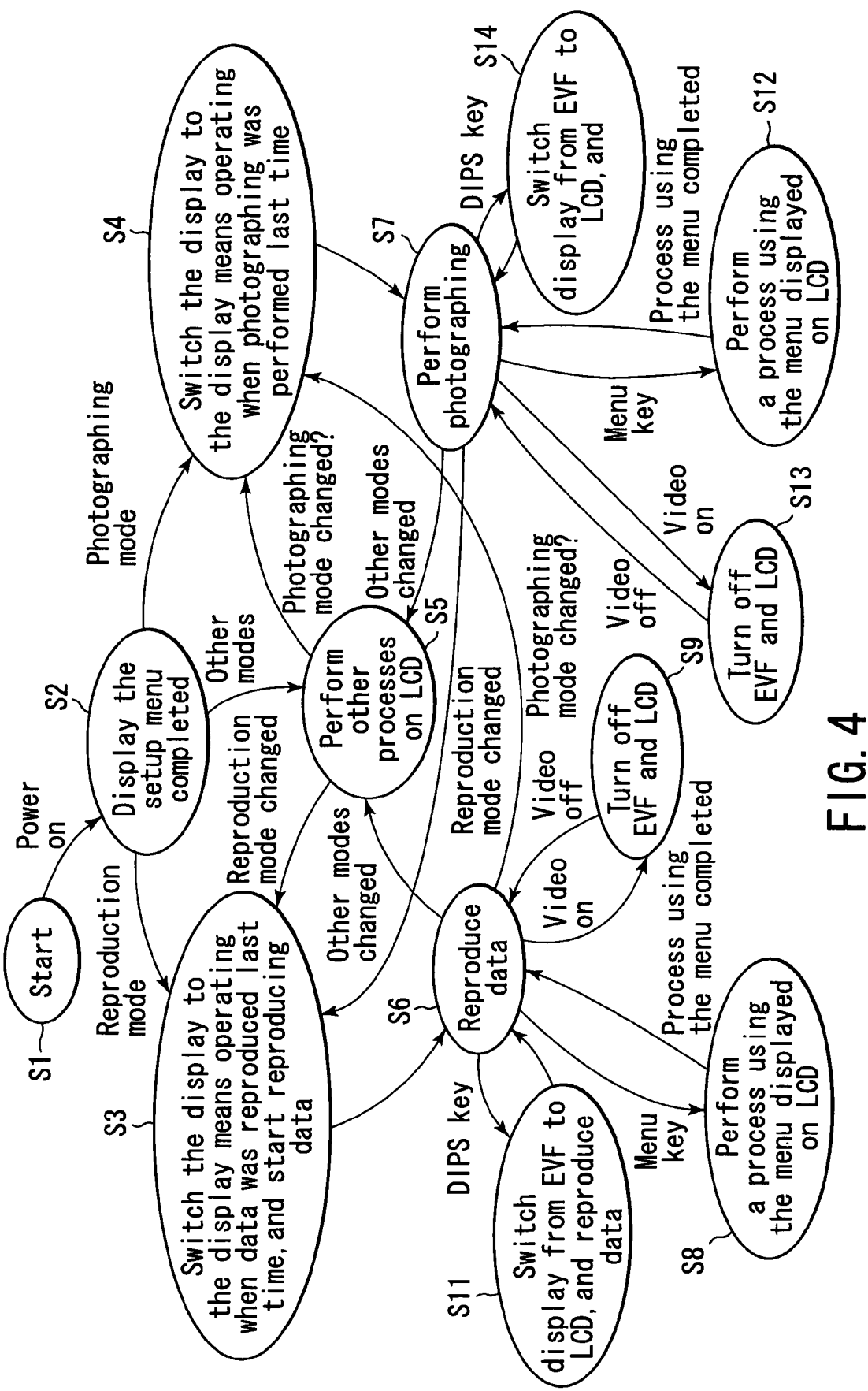
FIG. 4 is a diagram representing the operation transition that the digital camera undergoes while being used.

FIG. 4 is a diagram representing the operation transition that the digital camera undergoes while being used. FIG. 4 is a flowchart, too, which illustrates how the CPU 20 controls some of the other components of the digital camera. When the power switch is turned on, the LCD screen 622 (1027, in FIG. 2) displays the starting menu. Assume that the power switch is turned on for the first time (S1→S2) so that the camera is used for the first time. Then, the EVF 624 (or 1026 in FIG. 2) displays data in the case where icon A6 (automatic photographing mode), icon A1 (manual photographing mode), or icon A2 (moving-picture mode) has been selected, or the LCD screen 622 (or 1027 in FIG. 2) displays data in the case where icon A5 (reproduction mode) has been selected. The user may depress the display button 1037 to switch the display from the LCD screen 622 to the EVF 624, or vice versa.

Assume that the camera has been used several times. In this case, the operating state of the camera changes S1→S2→S3 if the user has selected icon A5 (reproduction mode) by turning the mode dial 1002, or S1→S2→S4 if the user has selected either icon A1 (manual photographing mode) or icon A6 (automatic photographing mode) or icon A2. In State S3, the display is switched to the one that operated in the last reproduction of data. In State S4, the display is switched to the one that operated in the last photographing. If the user has selected any mode other than the reproduction mode, manual photographing mode and automatic photographing mode or moving picture mode?, the camera enters State S5. Then, the LCD screen 622 (or 1027 in FIG. 2) operates.

The operating mode of the camera may be changed to, for example, the reproduction mode while the camera remains in State S5. If so, the camera enters State S3. If the camera is set to the manual or automatic photographing mode or moving picture mode, it enters State S4. It is natural that the camera goes from State S3 to State S6 (data reproduction), and that it goes from State S4 to S7 (photographing).

The user may operate the menu key while the camera remains in State S6 (data reproduction). In this case, the camera enters State S8, in which the LCD screen 622 (or 1027 in FIG. 2) displays the menu. When the user finishes selecting at least one menu item, the camera resumes State S6. Thus, the display is switched to the one that operated in the last reproduction of data. While the camera remains in State S6, it may be set to a video-on mode (to supply signals reproduced to an external monitor, e.g., a TV, through a digital-data terminal shown in FIG. 1A). Then, the camera assumes State S11, in which both the LCD screen 622 and the EVF 624 (or 1026 in FIG. 2) are turned off. Once the camera has been set to the video-off mode, it enters State S6. While the camera remains in State S6 (or in the reproduction mode), the user may depress the display button 1037 to switch the display from the LCD screen 622 to the EVF 624, or vice versa, in State S11.

While the camera remains in State S7 (photographing), the user may depress the menu key. If this is the case, the camera is made to enter State S12, in which the LCD screen 622 (or 1027 in FIG. 2) displays the menu. The user can therefore select one menu item or more menu items. When the user finishes selecting menu items, the camera resumes State S7. Therefore, the display is switched to the one that operated in the last photographing. While the camera remains in State S7, it may be set to a video-on mode (to supply signals reproduced to an external monitor, e.g., a TV, through a digital-data terminal shown in FIG. 1A). If so, the camera assumes State S13, in which both the LCD screen 622 and the EVF 624 are turned off. Once the camera has been set to the video-off mode, it enters State S7. While the camera remains in State S7 (photographing), the user may depress the display button 1037 to switch the display from the LCD screen 622 to the EVF 624, or vice versa, in State S14.

In the present invention, the display is forcibly switched to the LCD screen if the EVF is operating when the user pushes the menu key. Once the user finishes selecting one menu item or more menu items, the display is switched back to the EVF.

Every time the camera is turned on, the LCD screen is operated to display the setup menu because it can display the menu larger than the EVF does. Every time the camera is turned off, the data showing which display EVF or LCD screen, has been operating, is stored in a memory so that this display may be used when the power switch is turned on next time. Thus, if the camera is turned off in the reproduction mode while the EVF, for example, is displaying data, the LCD screen will start operating when the camera is turned on in starting or initial mode and the display will thereafter switched from the LCD screen to the EVF (State S3). When the camera is connected to an external display such as a TV monitor, both the LCD screen and the EVF are turned off to save power.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera comprising:
a camera body;
a first display means with a first display area;
a second display means with a second display area larger than the first display area of the first display means;
a switching means for forcibly switching a display state to the first display means when a photographing mode is set, and for forcibly switching the display state to the second display means when a reproduction mode is set, when a power switch is turned on, the switching means setting the first display means and the second display means to a sleep mode when the switching means is pushed for an extended period; and
a display-state restoring means for automatically restoring the first display means and the second display means to states that the first display means and the second display means assume before the switching means switches the display, respectively, the display-state restoring means forcibly turning on the second display means first when the camera body is turned on.

2. A digital camera comprising:
a camera body;
a first display means with a first display area;
a second display means with a second display area larger than the first display area of the first display means;
a switching means for forcibly switching a display state to the first display means in accordance with an operation input signal for displaying a menu, the switching means setting the first display means and the second display means to a sleep mode when the switching means is pushed for an extended period; and
a display-state restoring means for automatically restoring the first display means and the second display means to states that the first display means and the second display means assume before the switching means switches the display, when a process performed by using the menu is completed, the display-state restoring means forcibly turning on the second display means first when the camera body is turned on,
wherein the first display means and the second display means assume said states when the power of the digital camera is turned off.

3. The digital camera according to claim 1 or 2, wherein the first display means is an electronic viewfinder, and the second display means is a display panel unit mounted on the camera body of the digital camera.

4. The digital camera according to claim 1, wherein the first display means and the second display means assume said states when the power of the digital camera is turned off.

5. The digital camera according to claim 1 or 2, wherein the first display means and the second display means assume said states when the digital camera takes a picture, or shows a recently taken picture on the first or second display means.

6. The digital camera according to claim 1 or 2, further comprising a connection terminal for supplying reproduced image data to an external display device and in which both the first display means and the second display means are off while the reproduced image data is being supplied to the external display device through the connection terminal.

* * * * *